(12) United States Patent
Hirth et al.

(10) Patent No.: US 11,092,051 B2
(45) Date of Patent: Aug. 17, 2021

(54) METALLIC FILM HAVING APPLIED FLAT ELECTRICAL CONDUCTOR AND HONEYCOMB BODY PRODUCED USING SAID FILM

(71) Applicant: Continental Automotive GmbH, Hannover (DE)

(72) Inventors: Peter Hirth, Roesrath (DE); Christoph Pabst, Melle (DE)

(73) Assignee: Vitesco Technologies GmbH, Hannover (DE)

(*) Notice: Subject to any disclaimer, the term of this patent is extended or adjusted under 35 U.S.C. 154(b) by 4 days.

(21) Appl. No.: 16/322,783

(22) PCT Filed: Jul. 18, 2017

(86) PCT No.: PCT/EP2017/068067
§ 371 (c)(1),
(2) Date: Feb. 1, 2019

(87) PCT Pub. No.: WO2018/024478
PCT Pub. Date: Feb. 8, 2018

(65) Prior Publication Data
US 2019/0170040 A1 Jun. 6, 2019

(30) Foreign Application Priority Data
Aug. 4, 2016 (DE) .................... 10 2016 214 489.8

(51) Int. Cl.
*F01N 3/20* (2006.01)
*F01N 3/28* (2006.01)
(Continued)

(52) U.S. Cl.
CPC .......... *F01N 3/2026* (2013.01); *F01N 3/281* (2013.01); *F01N 3/2803* (2013.01);
(Continued)

(58) Field of Classification Search
CPC ...... F01N 3/2803; F01N 3/2026; F01N 3/281; F01N 2330/02; H05B 3/0004
(Continued)

(56) References Cited

U.S. PATENT DOCUMENTS

| 5,468,455 A | 11/1995 | Brück |
| 5,505,911 A | 4/1996 | Häfele |

(Continued)

FOREIGN PATENT DOCUMENTS

| CN | 2653143 Y | 11/2004 |
| CN | 102939157 | 2/2013 |

(Continued)

OTHER PUBLICATIONS

Office Action dated Mar. 16, 2021 issued in Chinese Patent Application No. 201780046071.7.

*Primary Examiner* — Tom P Duong
(74) *Attorney, Agent, or Firm* — Cozen O'Connor

(57) ABSTRACT

A metallic film includes: a top side; a flat electrical conductor; and a base insulation layer configured to attach the flat electrical conductor to the top side, the base insulation layer having: a cover layer covering the conductor in an electrically insulating manner. The film has at least one edge region without the electrical conductor and without either the base insulation layer or the cover layer, and the combined total thickness (D) of the electrical conductor, the base insulation layer and the cover layer, is less than 80 μm.

9 Claims, 2 Drawing Sheets

(51) Int. Cl.
  *H05B 3/00* (2006.01)
  *H05B 3/22* (2006.01)

(52) U.S. Cl.
  CPC ............. *H05B 3/0004* (2013.01); *H05B 3/22* (2013.01); *F01N 2330/02* (2013.01); *F01N 2330/04* (2013.01); *Y02T 10/12* (2013.01)

(58) Field of Classification Search
  USPC .......................... 422/174, 180; 219/541, 552
  See application file for complete search history.

(56) References Cited

U.S. PATENT DOCUMENTS

| | | | |
|---|---|---|---|
| 5,519,191 A * | 5/1996 | Ketcham | F01N 3/2026 219/552 |
| 5,686,164 A | 11/1997 | Maus et al. | |
| 5,948,371 A * | 9/1999 | Hafele | B01J 35/04 29/890 |
| 2014/0112850 A1 | 4/2014 | Hodgson et al. | |
| 2015/0189699 A1* | 7/2015 | Ploshikhin | H05B 3/145 219/541 |

FOREIGN PATENT DOCUMENTS

| | | |
|---|---|---|
| CN | 103154453 | 6/2013 |
| CN | 105464766 | 4/2016 |
| DE | 41 29 894 A1 | 3/1993 |
| DE | 43 43 705 A1 | 6/1995 |
| DE | 102014115923 | 5/2016 |
| EP | 0483708 | 5/1992 |
| EP | 0 603 227 B1 | 6/1994 |
| EP | 0 618 842 B1 | 10/1994 |
| JP | H 08103663 A | 4/1996 |
| WO | WO 2012/172033 A1 | 12/2012 |
| WO | WO 2013/104754 | 7/2013 |

* cited by examiner

METALLIC FILM HAVING APPLIED FLAT ELECTRICAL CONDUCTOR AND HONEYCOMB BODY PRODUCED USING SAID FILM

CROSS-REFERENCE TO RELATED APPLICATIONS

This is a U.S. national stage of international application No. PCT/EP2017/068067 filed on 18 Jul. 2017, which claims priority to the German Application No. 10 2016 214 489.8 filed 4 Aug. 2016, the content of both incorporated herein by reference.

BACKGROUND OF THE INVENTION

1. Field of the Invention

The present invention relates to the field of electrically heatable honeycomb bodies, in particular for use in the exhaust gas purification of internal combustion engines, preferably in motor vehicles.

2. Related Art

Electrically heatable honeycomb bodies are mainly used in motor vehicles as catalytic converter substrate bodies through which exhaust gas can flow and which, under certain operating conditions, for example during a cold start, are electrically heated to quickly reach a suitable temperature for catalytic reactions, or to maintain this even under unfavorable conditions.

Electrically heatable honeycomb bodies and their components have to achieve a long service life with constant electrical function despite high thermal fluctuating loads, aggressive environmental conditions and possible deposits, which places high demands on the materials and construction.

In recent developments, systems with a supply voltage of 24, 36 or even 48 V [Volt] are being considered instead of the 12 V in the supply network hitherto widely used in motor vehicles. This also places particular demands on electrical insulations and the electrical resistance to be selected in electrically heated honeycomb bodies. At higher voltages, it is scarcely possible for a honeycomb body as a whole to be configured as a heating resistor. Separate heating elements must be provided.

EP 0 618 842 B1 discloses an electrically heatable honeycomb body in which only an inner structure mounted in an electrically insulated manner in a holding structure is heatable, as a result of which a suitable electrical resistance and a durable construction are intended to be achieved.

Furthermore, a construction is already known from US 2014/0112850 A1 (WO 2012/172033) that is suitable for voltages of 24 V or higher. In this construction, parts of the sheet-metal layers forming a honeycomb body are used as heating elements and are held in suitable insulations.

EP 0 603 227 B1 has already also disclosed arranging a separate flat electrical conductor between two films clamped to each other. However, this arrangement requires a relatively large outlay and leads only with relative difficulty to honeycomb bodies of layered films to be processed.

In addition, U.S. Pat. No. 5,505,911 discloses an electrically heatable honeycomb body in which electrical conductors are applied in particular forms as a coating to a substrate structure. Although this document describes suitable possibilities for contact connection of such electrically conductive coatings, it does not contain components suitable either for higher voltages or for typical modern structural forms of honeycomb bodies.

SUMMARY OF THE INVENTION

It is therefore an object of the present invention to provide a metallic film having an applied flat electrical conductor, which film is suitable for producing electrically heatable honeycomb bodies, in particular for operation at electrical voltages of 24 to 48 V. It is furthermore an object of the invention to specify an electrically heatable honeycomb body produced using at least one such film, in particular for use in exhaust gas cleaning systems of a motor vehicle.

This object may be achieved by a metallic film and by a honeycomb body as set forth herein. Advantageous refinements that may be used individually or in technologically expedient combinations with one another are specified below as well.

The film according to a first aspect of the invention has, on its top side, a flat electrical conductor, attached thereto in an electrically insulated manner by a base insulation layer having a cover layer covering the conductor in an electrically insulating manner, wherein the film has at least one edge region without the electrical conductor and without insulating layers, and wherein the total thickness of the electrical conductor together with the insulating layers is less than 80 µm, preferably less than 60 µm. The relatively small total thickness of the electrical conductor with the insulating layers makes it possible to coil the film similarly as in the case of conventional films, to layer film with other films and to shape or even to structure the film or films to form a honeycomb body, in particular to form corrugated films. A flat electrical conductor, also called conductor strip, has the particular advantage that it has a large surface per length unit in comparison to its electrically conductive cross-sectional area, as a result of which ohmic heat arising in the conductor can be readily dissipated, in the present case into the metallic film and outward through the cover layer. A metallic film or a metallic coating applied to the base insulating layer are also suitable as the flat conductor. The insulating layers and the electrical conductor can also be applied, for example, by known chemical vapor deposition/physical vapor deposition methods (CVD/PVD methods), or by printing.

In one aspect, the film is composed of high-temperature-resistant steel and has a typical width for the axial length of honeycomb bodies of 5 to 30 cm [centimeter], preferably of 10 to 20 cm, a film thickness of 20 to 100 µm [micrometer], preferably 25 to 50 µm, wherein the at least one edge region has a width of at least 0.5 cm. With these dimensions, typical honeycomb bodies which have connections, soldered on their end sides, in the edge region of the film can be produced using the film.

In another aspect, the electrical insulations are configured and formed such that they reliably prevent electrical flashovers at voltages of 20 to 72 V [Volt]. Depending on the application, the electrical dielectric strength of the insulations has to be configured for the voltages used, i.e., in the case of systems having 24 V, has to withstand at least 24 V plus a safety margin, in the case of 48 V at least 48 V plus a safety margin for overvoltages possibly occurring during switching operations and the like.

The film is preferably smooth or corrugated with a structure suitable for metallic catalytic substrate bodies, wherein the at least one edge region is arranged in such a manner that it can be positioned on an end side of a honeycomb body produced from the film. Two edge regions which come to lie on both end sides of a honeycomb body are preferably provided.

In a preferred aspect of the invention, the flat electrical conductor is configured in length, cross section and profile such that it can absorb an electrical power of 500 to 5000 W. For this configuration, various parameters are available, which can be combined in a suitable manner. The length of the electrical conductor can be selected virtually as desired, for example by a meandering profile. Its thickness and width (i.e., the conductor cross section) can also be selected within wide limits. Thickness and/or width do not have to be identical overall here, but rather may also differ in regions depending on the desired temperature distribution. A U-shaped or meandering configuration of the electrical conductor enables the electrical connections thereof for connection to a power supply to be laid at any desired locations.

In a further preferred aspect of the invention, the flat conductor has a conductor surface that covers between 10 and 80%, preferably 30 to 50% of the top side of the film. The advantage of good heat transmission due to a large surface can be best applied, the larger the surface of the electrical conductor is in relation to the area of the film. However, an inhomogeneous distribution of the conductor surface may also be of advantage, for example if a honeycomb body is intended to be more greatly heated at its inlet side for exhaust gas than in other regions.

Another aspect of the invention relates to a honeycomb body through which a gas can flow from a first end side to a second end side, produced using at least one of the above-described films and using at least one further metallic film by coiling and/or alternately layering the films, wherein the films are soldered to one another on at least one end side of the honeycomb body. As mentioned, it is possible to produce the films as smooth films or as corrugated films, and therefore typical honeycomb bodies, which have previously been produced from smooth and corrugated films, can also be produced as smooth and/or corrugated films using the above-described films according to the invention. Whether corrugated or smooth films with electrical conductors are used and how many thereof in each case are used depends on the desired heating power and other structural details. In terms of manufacturing, only the electrical contact connection of the electrical conductors, which generally takes place through a casing tube surrounding the honeycomb body, has to be taken into consideration. The thickening of the film arising by the application of the electrical conductor and its insulating layers is so slight that the pressure loss of the honeycomb body is scarcely increased.

However, a honeycomb body is particularly preferred, in which the at least one film with an electrical conductor is a smooth film which, together with at least one corrugated film arranged adjacent and having corrugation crests and corrugation troughs, forms the honeycomb body, wherein, in an inner region in which the film with the electrical conductor and the insulations thereof is thicker than in an edge region of the corrugated film, the at least one corrugated film has a corrugation height smaller by the total thickness, and therefore, in the edge region of the corrugated film at the corrugation crests and the corrugation troughs, metallic contacts with the edge region of the smooth film are produced and can be connected by soldering. Although the total thickness of the electrical conductor with its insulations does not cause any particular problems during the manufacturing in comparison to the other dimensions in a honeycomb body, it is nevertheless advantageous if the thickness is compensated for by a suitable modification of the corrugation height of an adjacent corrugated layer because then readily solderable metallic contact points arise on the end side or the end sides of the honeycomb body.

It is thereby possible to form a plurality of smooth and corrugated films, of which at least one has an electrical conductor, layered alternatively on one another and interlaced with one another to form a honeycomb body.

BRIEF DESCRIPTION OF THE DRAWINGS

Further details and exemplary embodiments of the invention will be described in more detail below with reference to the drawings, wherein even details illustrated in different figures can occur in combination with one another in a honeycomb body according to the invention. In the drawings.

DETAILED DESCRIPTION OF THE PRESENTLY PREFERRED EMBODIMENTS

Figure 1:
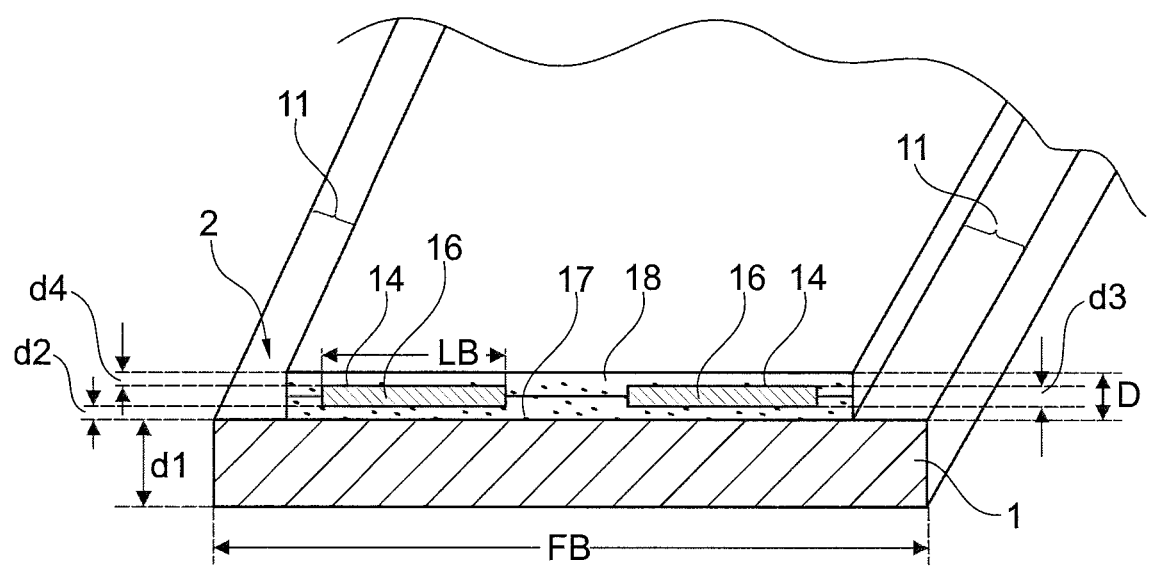
FIG. 1 shows schematically a cross section through a film with a flat electrical conductor.

FIG. 1 shows, in a partially perspective view, a cross section through a film 1 having a top side 2. The film 1 has a film width FB of, for example, 5 to 30 cm and a film thickness d1 of, for example, 20 to 100 μm, preferably 25 to 50 μm. On the top side 2 of the film 1, with an edge regions 11 being left free, preferably on both sides of the film 1, a base insulating layer 17 having a minimum thickness d2 of, for example, 10 to 20 μm is applied, on which, in turn, a flat electrical conductor 14 is arranged which, for example, runs in a U shape or meandering form. The electrical conductor 14 has a width LB of, for example, 1 to 3 cm and an average length LL (not illustrated here) of, for example, 20 to 100 cm and a thickness d3 of, for example, 5 to 20 μm. The product of conductor width LB and conductor thickness d3 produces the conductor cross section 16, illustrated shaded. Base insulating layer 17 and electrical conductor 14 are covered by an electrically insulating cover layer 18 having a minimum thickness d4 of, for example, 10 to 20 μm. A minimum thickness is understood in each case as meaning the layer thickness d2, d4 on and under the electrical conductor 14 that has to suffice in order to ensure electrical flashovers at a supply voltage of 24, 36 or 48 V.

Figure 2:
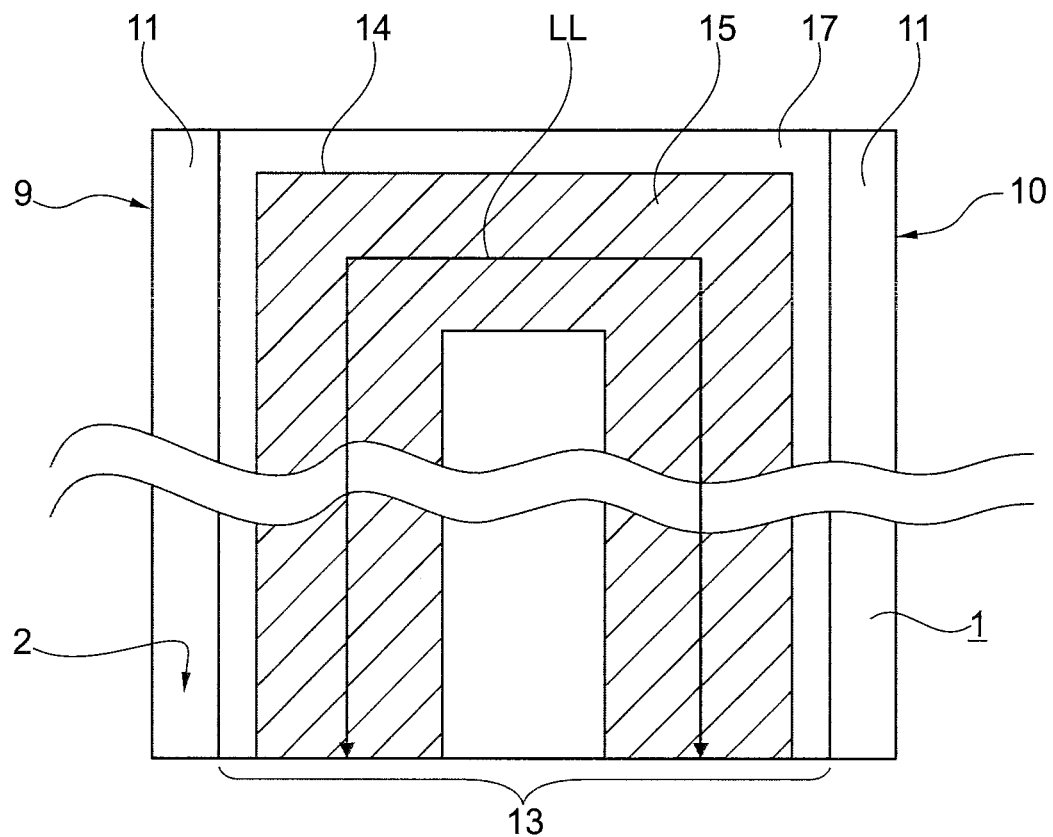
FIG. 2 shows a schematic view from above of a film according to FIG. 1 without an electrically insulating cover layer.

FIG. 2 shows a view from above of the film 1 illustrated in FIG. 1 with the cover layer 18 omitted. In this exemplary embodiment, the electrical conductor 14 runs in a U shape, as a result of which it has an average length LL of virtually twice the length of the film 1. In the case of a conductor running forward and back in a meandering manner on the film 1, virtually any desired length of the electrical conductor 14 can therefore be set. The conductor surface 15 (illustrated shaded) of the electrical conductor 14 covers, for example, 10 to 80% of the top side 2 of the film 1. In the present exemplary embodiment, the base insulating layer 17 leaves a respective edge region 11 free on both sides of the film 1, the edge regions subsequently coming to lie against a first end side 9 and a second end side 10 when the film 1 is used to construct a honeycomb body. Only an inner region 13 of the film 1 is thickened by the electrical conductor 14 and the insulating layers 17, 18 thereof.

Figure 3:
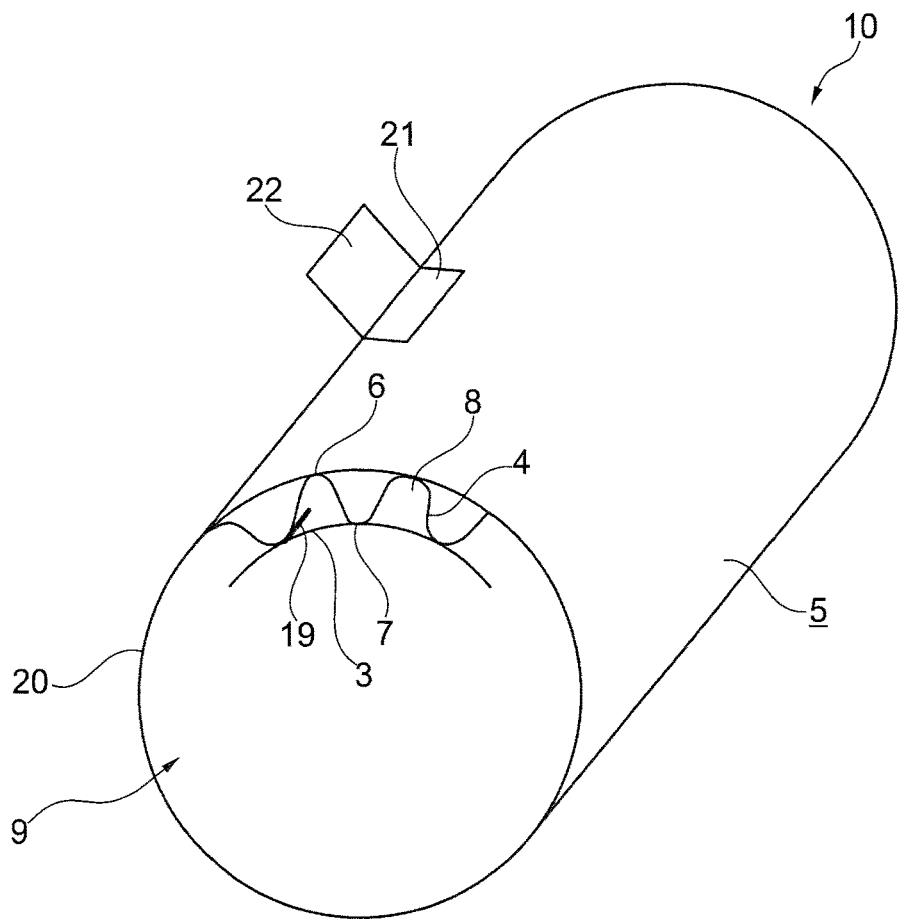
FIG. 3 shows schematically a perspective view of a honeycomb body.

FIG. 3 shows schematically in a perspective view a honeycomb body 5 with a first end side 9 and a second end side 10. Channels 8 formed by smooth films 3 and corrugated films 4 make it possible for a gas to be able to flow through the honeycomb body 5 from the first end side 9 to the second end side 10. The corrugated films 4 form corrugation crests 6 and corrugation troughs 7 which, on the end sides, touch the adjacent smooth films 3 and are at least partially connected there by soldered connections 19. The honeycomb body 5 is arranged in a casing tube 20 through which, at a leadthrough 21, the electrical connection between an electrical connection 22 and the at least one electrical conductor 14 in the interior of the honeycomb body 5 can be produced.

Figure 4:
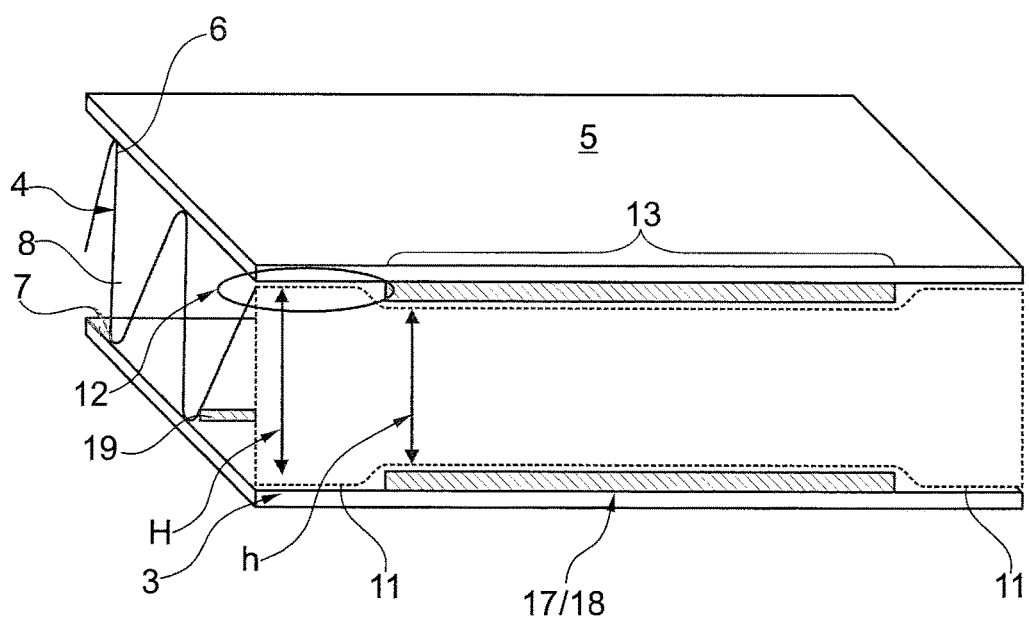
FIG. 4 shows schematically a perspective longitudinal section through part of a honeycomb body.

FIG. 4 shows schematically a preferred exemplary embodiment of the invention, in which at least one smooth film 3 having an electrical conductor (not illustrated here) arranged between insulating layers 17, 18 is arranged adjacent to a corrugated film 4. The longitudinal section shown through part of a honeycomb body 5 shows that the corrugation of the corrugated film 4 has two different corrugation heights H and h, namely a corrugation height H in an edge region 12 of the corrugated film 4 and a reduced corrugation height h in an inner region 13 of the honeycomb body 5, in which the smooth film 3 having the insulating layers 17, 18 (and the electrical conductor, not illustrated) is thicker than in its edge region 11. By the different corrugation heights H and h, the smooth films 3 and the corrugated films 4 in the honeycomb body 5 touch on the end sides, which permits a connection by soldering points 19. A stable electrically heatable honeycomb body is thus produced.

The present invention is particularly suitable for use in exhaust-gas purification systems of motor vehicles, in particular in the case of a 24, 36, or 48 V power supply, and is only minimally susceptible to electrical flashovers, for example in the event of deposits or corrosion.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A metallic film (1) comprising:
    a top side (2);
    a flat electrical conductor (14); and
    a base insulation layer (17) configured to attach the flat electrical conductor (14) to the top side (2), the base insulation layer (17) having:
        a cover layer (18) covering the conductor (14) in an electrically insulating manner,
    wherein the film (1) has:
        two edge regions (11), one on each of opposite sides of the film (1), without the electrical conductor (14) and without either the base insulation layer (17) or the cover layer (18), and
        only a single inner edge region (13) of the film (1) configured such that only the single inner edge region (13) of the film (1) is thickened by the electrical conductor (14), the insulation layer (17) and the cover layer (18),
    wherein the combined total thickness (D) of the electrical conductor (14), the base insulation layer (17) and the cover layer (18), is less than 80 µm, and
    wherein the electrical conductor is shaped so as to only extend to a single edge of the film.

2. The metallic film (1) as claimed in claim 1, wherein the film (1) comprises high-temperature-resistant steel and has a film width (FB) of 5 to 30 cm, a film thickness (d1) of 20 to 100 µm, wherein the at least one edge region (11) of the metallic film (1) has a width of at least 0.5 cm.

3. The metallic film (1) as claimed in claim 1, wherein the base insulation layer (17) and the cover layer (18) are configured so as to prevent electrical flashovers at voltages of 20 Volt to 72 Volt.

4. The metallic film (1) as claimed in claim 1, wherein the film (1) is smooth or corrugated.

5. The metallic film (1) as claimed in claim 1, wherein the flat electrical conductor (14) has a conductor length (LL), a conductor cross section (LQ) and a profile dimensioned so as to absorb electrical power of 500 to 5000 W during operation.

6. The metallic film (1) as claimed in claim 1, wherein the flat conductor (14) has a conductor surface (LF) covering between 10 and 80% of the top side (2) of the film (1).

7. A honeycomb body (5) comprising:
    a first end side (9);
    a second end side (10), the honeycomb body (5) being configured to permit gas flow through the honeycomb body (5) from the first end side (9) to the second end side (10) in a flow direction (S); and
    a plurality of films, having:
        at least one metallic film (1) as claimed in claim 1; and
        at least one further smooth metallic film (3) and/or corrugated metallic film (4), wherein the honeycomb body comprises a coiling and/or alternately layering of the plurality of films (1, 3, 4), and wherein respective ones of the plurality of films (1, 3, 4) are connected to one another on at least one of the first and second end sides (9, 10) of the honeycomb body (5) by soldered connection (19).

8. The honeycomb body (5) as claimed in claim 7, wherein the at least one metallic film (1) with the flat electrical conductor (14) is a smooth film, which, together with at least one corrugated film (4), is arranged adjacent the smooth film, and having corrugation crests (6) and corrugation troughs (7), to form the honeycomb body (5) with channels (8) through which gas can flow, wherein, in the inner edge region (13) in which the smooth film (3) with the electrical conductor (14) and the insulations (17, 18) thereof is thicker than in an edge region (12) of the corrugated film (4), the at least one corrugated film (4) has a corrugation height (h) reduced by said total thickness (D) such that, in the edge region (12) of the corrugated film (4) at the corrugation crests (6) and the corrugation troughs (7), metallic contacts with the edge region (11) of the smooth film (3) are produced and are connectable by soldered connections (19).

9. The honeycomb body (5) as claimed in claim 8, wherein a plurality of smooth and corrugated films (3, 4), of which at least one has an electrical conductor (14), are layered alternately on one another and interlaced with one another, to form the honeycomb body (5).

\* \* \* \* \*